(12) United States Patent
Kato et al.

(10) Patent No.: US 11,373,198 B2
(45) Date of Patent: Jun. 28, 2022

(54) EVALUATION DEVICE, EVALUATION METHOD, AND EVALUATION PROGRAM

(71) Applicant: HONDA MOTOR CO., LTD., Tokyo (JP)

(72) Inventors: Takumi Kato, Tokyo (JP); Mai Takemoto, Tokyo (JP); Naotada Ishibashi, Tokyo (JP); Yosuke Inoue, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 280 days.

(21) Appl. No.: 15/702,060

(22) Filed: Sep. 12, 2017

(65) Prior Publication Data

US 2018/0158076 A1 Jun. 7, 2018

(30) Foreign Application Priority Data

Dec. 2, 2016 (JP) ............................ JP2016-235205
May 9, 2017 (JP) ............................ JP2017-093313

(51) Int. Cl.
*G06Q 30/02* (2012.01)
*G06Q 10/06* (2012.01)

(52) U.S. Cl.
CPC ....... *G06Q 30/0201* (2013.01); *G06Q 10/063* (2013.01)

(58) Field of Classification Search
CPC .. G06Q 30/00; G06Q 30/0201; G06Q 10/063; G06Q 10/0635
See application file for complete search history.

(56) References Cited

U.S. PATENT DOCUMENTS

| 8,234,263 | B2 * | 7/2012 | Pradhan | G06F 16/335 |
| | | | | 707/711 |
| 10,691,770 | B2 * | 6/2020 | Jaroch | G06F 40/284 |
| 11,132,699 | B2 * | 9/2021 | Sakamoto | G06Q 30/0282 |

(Continued)

FOREIGN PATENT DOCUMENTS

| CN | 1732462 A | 2/2006 |
| CN | 101627402 A | 1/2010 |

(Continued)

OTHER PUBLICATIONS

H. Weidong, W. Xiaonan and L. Chunming, "Customer Satisfaction Analysis Based on User-Generated Content," 2021 14th International Symposium on Computational Intelligence and Design (ISCID), 2021, pp. 234-237, doi: 10.1109/ISCID52796.2021.00061. (Year: 2021).*

(Continued)

*Primary Examiner* — Eric R Netzloff
(74) *Attorney, Agent, or Firm* — Squire Patton Boggs (US) LLP

(57) ABSTRACT

An evaluation device according to one aspect of the present invention includes an extractor configured to extract data related to a brand preset by a company or an organization from data collected from an information medium, and a calculator configured to calculate a first index value indicating a frequency of appearance of a first term indicating content expected by the company or organization in the data extracted by the extractor and a second index value indicating a frequency of appearance of a second term indicating a response of a customer in the extracted data.

5 Claims, 12 Drawing Sheets

(56) References Cited

U.S. PATENT DOCUMENTS

| | | | |
|---|---|---|---|
| 2003/0069822 A1 | 4/2003 | Ito et al. | |
| 2006/0149614 A1 | 7/2006 | Suzuki et al. | |
| 2010/0121843 A1* | 5/2010 | Goeldi | G06Q 50/01 707/722 |
| 2011/0137906 A1* | 6/2011 | Cai | G06F 40/30 707/740 |
| 2012/0011158 A1* | 1/2012 | Avner | G06F 16/374 707/777 |
| 2012/0316916 A1* | 12/2012 | Andrews | G06Q 10/0635 705/7.28 |
| 2013/0014223 A1* | 1/2013 | Bhatia | H04N 21/812 726/4 |
| 2013/0035986 A1* | 2/2013 | Kursar | G06Q 30/0201 705/7.31 |
| 2013/0138749 A1* | 5/2013 | Bohm | H04L 51/32 709/206 |
| 2014/0337118 A1* | 11/2014 | Huddleston | G06Q 30/0242 705/14.41 |
| 2015/0038524 A1* | 2/2015 | Aslund | A61P 25/04 514/282 |
| 2015/0106155 A1* | 4/2015 | Castellanos | G06Q 50/01 705/7.29 |

FOREIGN PATENT DOCUMENTS

| | | |
|---|---|---|
| CN | 102084386 A | 6/2011 |
| CN | 102598038 A | 7/2012 |
| CN | 103268560 A | 8/2013 |
| CN | 103389998 A | 11/2013 |
| CN | 103839169 A | 6/2014 |
| CN | 104137128 A | 11/2014 |
| CN | 104572775 A | 4/2015 |
| CN | 104636371 A | 5/2015 |
| CN | 104978665 A | 10/2015 |
| CN | 105303394 A | 2/2016 |
| JP | 2003-108738 A | 4/2003 |
| JP | 2005-063242 A | 3/2005 |
| JP | 2006-031194 A | 2/2006 |
| JP | 2006-286026 A | 10/2006 |
| JP | 2008-234090 A | 10/2008 |
| JP | 2009-245369 A | 10/2009 |
| JP | 2010-061332 A | 3/2010 |
| JP | 2011-003157 A | 1/2011 |
| JP | 2011-070541 A | 4/2011 |
| JP | 2013-178754 A | 9/2013 |
| JP | 2014-010511 A | 1/2014 |
| JP | 2014-032636 A | 2/2014 |
| JP | 2014-229252 A | 12/2014 |
| JP | 2015-022429 A | 2/2015 |
| JP | 2015-072612 A | 4/2015 |
| JP | 2015-095249 A | 5/2015 |
| WO | WO 2004/055707 A1 | 7/2004 |
| WO | WO 2004/066175 A1 | 8/2004 |
| WO | 2015/130555 A1 | 9/2015 |
| WO | 2016/072474 A1 | 5/2016 |

OTHER PUBLICATIONS

Toro Nakamura et al., Research regarding Measurement of Brand Image using Web site, Japan Industrial Management Association, Proceedings of The 2008 Annual Autumn Meeting, Oct. 17, 2008, pp. 114 and 115 (partial translation).
Japanese Notice of Allowance application No. 2017-093313 dated Feb. 5, 2019.
Notice of Reasons for Rejection dated Mar. 10, 2020 corresponding to Japanese Patent Application No. 2019-038946, and English translation thereof.
Chinese Office Action issued in corresponding Chinese Patent Application No. 201711043512.6 dated Mar. 29, 2021.
Chinese Notice of Allowance issued in corresponding Chinese Patent Application No. 201711043512.6 dated Oct. 11, 2021.
Chinese Office Action issued in corresponding Chinese Patent Application No. 201711043512.6 dated Oct. 11, 2021.

* cited by examiner

FIG. 2

| LARGE CLASSIFICATION 1 (e.g., "trust") | MIDDLE CLASSIFICATION 1-1 (e.g., "safe") | KEYWORDS (e.g., "safe," "relief," "trust," ⋯) |
|---|---|---|
| | MIDDLE CLASSIFICATION 1-2 (e.g., "high quality") | KEYWORDS (e.g., "high quality," "safe," "does not break," ⋯) |
| LARGE CLASSIFICATION 2 (e.g., "new") | MIDDLE CLASSIFICATION 2-1 (e.g., "originality") | KEYWORDS (e.g., "originality," "futuristic," ⋯) |
| | MIDDLE CLASSIFICATION 2-2 (e.g., "new technology") | KEYWORDS (e.g., "new technology," "has not existed in the past," ⋯) |
| | MIDDLE CLASSIFICATION 2-3 (e.g., "most advanced") | KEYWORDS (e.g., "most advanced," "new technology," ⋯) |
| LARGE CLASSIFICATION 3 (e.g., challenge) | MIDDLE CLASSIFICATION 3-1 | KEYWORDS |
| | MIDDLE CLASSIFICATION 3-2 | KEYWORDS |

FIG. 3

| RELIEF | ANXIETY |
|---|---|
| SATISFACTION | DISSATISFACTION |
| LIKE | DISLIKE |
| EXPECTATION | DISAPPOINTMENT |

| LARGE CLASSIFICATION | MIDDLE CLASSIFICATION | SMALL CLASSIFICATION | KEYWORDS |
|---|---|---|---|
| LARGE CLASSIFICATION 1 (e.g., "due to company") | MIDDLE CLASSIFICATION 1-1 (e.g., "management quality") | SMALL CLASSIFICATION 1-1-1 (e.g., "performance") | KEYWORDS (e.g., "performance deterioration," "stock price plunge," "illegal," ...) |
| | | SMALL CLASSIFICATION 1-1-2 (e.g., "personnel") | KEYWORDS (e.g., "restructuring," "hard work," "dismissal," ...) |
| | MIDDLE CLASSIFICATION 1-2 (e.g., "product quality") | SMALL CLASSIFICATION 1-2-1 (e.g., "failure") | KEYWORDS (e.g., "failure," "break down," "defect," ...) |
| | | SMALL CLASSIFICATION 1-2-2 (e.g., "accident") | KEYWORDS (e.g., "accident," "failure," "burning," ...) |
| LARGE CLASSIFICATION 2 (e.g., "due to external causes") | MIDDLE/SMALL CLASSIFICATION 2-1 (e.g., "currency exchange") | | KEYWORDS (e.g., "strong yen," "exchange rate fluctuations," ...) |
| | MIDDLE/SMALL CLASSIFICATION 2-2 (e.g., "disaster") | | KEYWORDS (e.g., "disaster," "abnormal weather," ...) |
| | MIDDLE/SMALL CLASSIFICATION 2-3 (e.g., "information risk") | | KEYWORDS (e.g., "cyber attack," "virus infection," ...) |
| LARGE CLASSIFICATION 3 | MIDDLE/SMALL CLASSIFICATION 3-1 | | KEYWORDS |
| | MIDDLE CLASSIFICATION 3-2 | SMALL CLASSIFICATION 3-2-1 | KEYWORDS |
| | | SMALL CLASSIFICATION 3-2-2 | |

FIG. 4B

| LARGE CLASSIFICATION | MIDDLE CLASSIFICATION | SMALL CLASSIFICATION | KEYWORDS |
|---|---|---|---|
| LARGE CLASSIFICATION 1 (e.g., "due to company") | MIDDLE CLASSIFICATION 1-1 (e.g., "management quality") | SMALL CLASSIFICATION 1-1-1 (e.g., "performance") | (e.g., "performance deterioration," "stock price plunge," "illegal," "strike," "large inventory," "arrears in pay," "non-payment" ...) |
| | | SMALL CLASSIFICATION 1-1-2 (e.g., "personnel") | (e.g., "restructuring," "hard work," "dismissal," "unpaid salary," "excessive overtime," "service overtime," "graffiti," ...) |
| | MIDDLE CLASSIFICATION 1-2 (e.g., "product quality") | SMALL CLASSIFICATION 1-2-1 (e.g., "failure") | (e.g., "failure," "break down," "defect," "sounds noisy," "great vibration," ...) |
| | | SMALL CLASSIFICATION 1-2-2 (e.g., "accident") | (e.g., "accident," "failure," "burning," "dangerous," "it is difficult to work," "poor environment," "near-miss," ...) |
| LARGE CLASSIFICATION 2 (e.g., "due to external causes") | MIDDLE/SMALL CLASSIFICATION 2-1 (e.g., "currency exchange") | | (e.g., "strong yen," "exchange rate fluctuations," "exchange rate intervention," "trade deficit," "purchasing power decrease," "dispute," "demonstration," ...) |
| | MIDDLE/SMALL CLASSIFICATION 2-2 (e.g., "disaster") | | (e.g., "disaster," "abnormal weather," "warming," "El Nino phenomenon," "La Nina phenomenon," ...) |
| | MIDDLE/SMALL CLASSIFICATION 2-3 (e.g., "information risk") | | (e.g., "cyber attack," "virus infection," "security software," "increase of turnover rate," ...) |
| LARGE CLASSIFICATION 3 | MIDDLE/SMALL CLASSIFICATION 3-1 | | KEYWORDS |
| | MIDDLE CLASSIFICATION 3-2 | SMALL CLASSIFICATION 3-2-1 | KEYWORDS |
| | | SMALL CLASSIFICATION 3-2-2 | |

FIG. 9

| PROCESSING TARGET DATA | INDIVIDUAL MIRROR SCORE | INDIVIDUAL THERMO SCORE |
|---|---|---|
| (PROCESSING TARGET DATA 1)<br>The new version of product A was very cool. The exhibition is at the store of XX. You should check it out. | "product A" × "new version" × "joy" = 1.0 | "product A" × "new version" × "expectation" = 1.0 |
| (PROCESSING TARGET DATA 2)<br>The exhibition of the new version of XX was very cool. You should check it out. | "-·-" × "new version" × "joy" = 0.0 | "-·-" × "new version" × "expectation" = 0.0 |
| (PROCESSING TARGET DATA 3)<br>The exhibition of the new version of product A of company A was very cool. You should check it out. | "company A" × "new version" × "joy" = 0.5<br>"product A" × "new version" × "joy" = 0.5 | "company A" × "new version" × "expectation" = 0.5<br>"product A" × "new version" × "expectation" = 0.5 |

TIME SERIES DATA OF MIRROR SCORE AND THERMO SCORE FOR BRAND A

TIME SERIES DATA OF MIRROR SCORE AND THERMO SCORE FOR BRAND B

EVALUATION DEVICE, EVALUATION METHOD, AND EVALUATION PROGRAM

BACKGROUND OF THE INVENTION

Field of the Invention

The present invention relates to an evaluation device, an evaluation method, and an evaluation program.

The present application claims priority based on Japanese patent application 2016-235205, filed on Dec. 2, 2016 and Japanese patent application 2017-93313, filed on May 9, 2017 and includes herein by reference the content thereof.

Description of Related Art

In the related art, information posted on various media such as television, newspapers, magazines, and web articles with regard to brands used by companies and organizations (hereinafter also collectively referred to as "companies") is collected and the degrees of exposure of the brands to the public, images of the brands, and the like are evaluated. This brand evaluation can be helpful for the companies in making brand strategy decisions or the like.

For example, Japanese Unexamined Patent Application, First Publication No. 2015-95249 suggests a brand evaluation method in which information regarding a predetermined brand exposed through a medium is collected, the degree of exposure of the brand to the medium, the degree of interest in the brand representing the interest of the public regarding the brand, or the like are calculated, and these are aggregated to calculate a predetermined evaluation index. Other brand evaluation methods using various indices are also known (see Japanese Unexamined Patent Application, First Publication No. 2014-32636, PCT International Publication No. 2004-066175, PCT International Publication No. 2004-055707, and Japanese Unexamined Patent Application, First Publication No. 2003-108738).

SUMMARY OF THE INVENTION

In the brand evaluation method described in Japanese Unexamined Patent Application, First Publication No. 2015-95249, the evaluation index is calculated by acquiring information exposed through the media with regard to a predetermined brand. However, in this evaluation method, for example, it is not possible to evaluate the gap between the brand's image expected by a company which is the brand's owner and the response of the public. It is also not possible to appropriately evaluate whether the information exposed through the media is positive or negative.

In brand evaluation methods in the related art, media such as television, newspapers, magazines and the like are emphasized. However, in recent years, it has become necessary to comprehensively and uniformly evaluate various media including social networking services (SNSs) and the like in which the public's responses are prominently expressed.

One aspect of the present invention provides an evaluation device, an evaluation method, and an evaluation program which can evaluate the gap between an image of a brand expected by a company and a response of the public (consumer) and can appropriately evaluate how the public has responded to activities or the like performed by the company. Another aspect of the present invention provides an evaluation device, an evaluation method, and an evaluation program in which, when evaluating the gap between an image of the brand and a response of the public, it is possible to appropriately perform the evaluation by incorporating the probability of information being exposed through media and further to evaluate the degree of risk of the company.

(1): An evaluation device according to one aspect of the present invention may include an extractor configured to extract data related to a brand preset by a company or an organization from data collected from an information medium (for example, a screener 12 in an embodiment), and a calculator configured to calculate a first index value indicating a frequency of appearance of a first term indicating content expected by the company or organization in the data extracted by the extractor and a second index value indicating a frequency of appearance of a second term indicating a response of a customer in the extracted data (for example, a scorer 18 in the embodiment).

(2): The evaluation device according to aspect (1) may further include a first storage storing the first term (for example, a mirror dictionary 36 in the embodiment), and a second storage storing the second term (for example, a thermo dictionary 38 in the embodiment). The calculator may be configured to calculate the first index value on the basis of the first term stored in the first storage and to calculate the second index value on the basis of the second term stored in the second storage.

(3): In the evaluation device according to aspect (1) or (2), the calculator maybe configured to determine whether each data collected from the information medium indicates positive content or negative content with regard to each of the first index value and the second index value.

(4): In the evaluation device according to any one of aspects (1) to (3), the calculator may be configured to weight data including the first term and data including the second term on the basis of a type of the information medium to calculate the first index value and the second index value.

(5): The evaluation device according to any one of aspects (1) to (4) may further include a generator configured to generate information allowing display of an image comparing the first index value and the second index value (for example, a scorer 18 in the embodiment).

(6): An evaluation method according to another aspect of the present invention may include extracting data related to a brand preset by a company or an organization from data collected from an information medium, and calculating a first index value indicating a frequency of appearance of a first term indicating content expected by the company or organization in the extracted data and a second index value indicating a frequency of appearance of a second term indicating a response of a customer in the extracted data.

(7): A non-transitory computer-readable storage medium storing an evaluation program according to another aspect of the present invention, which when executed by a computer, may cause the computer to execute extracting data related to a brand preset by a company or an organization from data collected from an information medium, and calculating a first index value indicating a frequency of appearance of a first term indicating content expected by the company or organization in the extracted data and a second index value indicating a frequency of appearance of a second term indicating a response of a customer in the extracted data.

(8): An evaluation device according to another aspect of the present invention may include an extractor configured to extract data related to a brand preset by a company or an organization from data collected from an information medium (for example, a screener 12 in an embodiment), and a calculator configured to calculate a first index value indicating a frequency of appearance of a first term indicating content expected by the company or organization in the data extracted by the extractor, a second index value indicating a frequency of appearance of a second term indicating a response of a customer in the extracted data, and a third index value on the basis of both a frequency of appearance of a third term indicating a risk of the company or organization in the extracted data and a type of the information medium (for example, a scorer 18 in the embodiment).

(9): The evaluation device according to aspect (8) may further include a first storage storing the first term (for example, a mirror dictionary 36 in the embodiment), a second storage storing the second term (for example, a thermo dictionary 38 in the embodiment), and a third storage storing the third term (for example, a risk dictionary 40 in the embodiment). The calculator may be configured to calculate the first index value on the basis of the first term stored in the first storage, to calculate the second index value on the basis of the second term stored in the second storage, and to calculate the third index value on the basis of the third term stored in the third storage.

(10): In the evaluation device according to aspect (8) or (9), the calculator may be configured to determine whether each data collected from the information medium indicates positive content or negative content with regard to each of the first index value, the second index value, and the third index value.

(11): In the evaluation device according to any one of aspects (8) or (10), the calculator may be configured to weight data including the first term and data including the second term on the basis of a type of the information medium to calculate the first index value and the second index value.

(12): In the evaluation device according to any one of aspects (8) or (11), the calculator may be configured to calculate a frequency of appearance of the third term for each of a plurality of information media and to calculate the third index value on the basis of both the calculated frequency of appearance of the third term for each information medium and a threshold set for each of the plurality of information media.

(13): The evaluation device according to any one of aspects (8) or (12) may further include a generator configured to generate information allowing display of an image comparing the first index value, the second index value, and the third index value (for example, a scorer 18 in the embodiment).

(14): An evaluation method according to another aspect of the present invention may include extracting data related to a brand preset by a company or an organization from data collected from an information medium, and calculating a first index value indicating a frequency of appearance of a first term indicating content expected by the company or organization in the extracted data, a second index value indicating a frequency of appearance of a second term indicating a response of a customer in the extracted data, and a third index value on the basis of both a frequency of appearance of a third term indicating a risk of the company or organization in the extracted data and a type of the information medium.

(15): A non-transitory computer-readable storage medium storing an evaluation program according to another aspect of the present invention, which when executed by a computer, may cause the computer to execute extracting data related to a brand preset by a company or an organization from data collected from an information medium, and calculating a first index value indicating a frequency of appearance of a first term indicating content expected by the company or organization in the extracted data, a second index value indicating a frequency of appearance of a second term indicating a response of a customer in the extracted data, and a third index value on the basis of both a frequency of appearance of a third term indicating a risk of the company or organization in the extracted data and a type of the information medium.

According to aspects (1), (2), (5), (6), (7), (8), (9), (13), (14), and (15) of the present invention, it is possible to evaluate the gap between an image of a brand expected by a company or an organization and a response of the public (customer) and to appropriately evaluate how the public has responded to activities performed by the company or organization. In addition, when evaluating the gap between the image of the brand and the response of the public, it is possible to appropriately perform the evaluation by incorporating the probability of information being exposed through the media and further to evaluate the degree of risk of the company.

According to aspects (3) and (10) of the present invention, it is possible to determine whether each data collected from the information medium indicates positive content or indicates negative content.

According to aspects (4), (11), and (12) of the present invention, it is possible to comprehensively and uniformly evaluate data collected from various information media.

BRIEF DESCRIPTION OF THE DRAWINGS

FIG. 2 is a diagram showing an example of dictionary data stored in a mirror dictionary according to the embodiment.

FIG. 3 is a diagram showing an example of dictionary data stored in a thermo dictionary according to the embodiment.

FIG. 4A is a diagram showing an example of dictionary data stored in a risk dictionary according to the embodiment.

FIG. 4B is a diagram showing another example of the dictionary data stored in the risk dictionary according to the embodiment.

FIG. 9 is a diagram showing an example of a scoring process of the evaluation device according to the embodiment.

DETAILED DESCRIPTION OF THE INVENTION

Hereinafter, an evaluation device, an evaluation method, and an evaluation program according to some embodiments of the present invention will be described with reference to the drawings.

Figure 1:
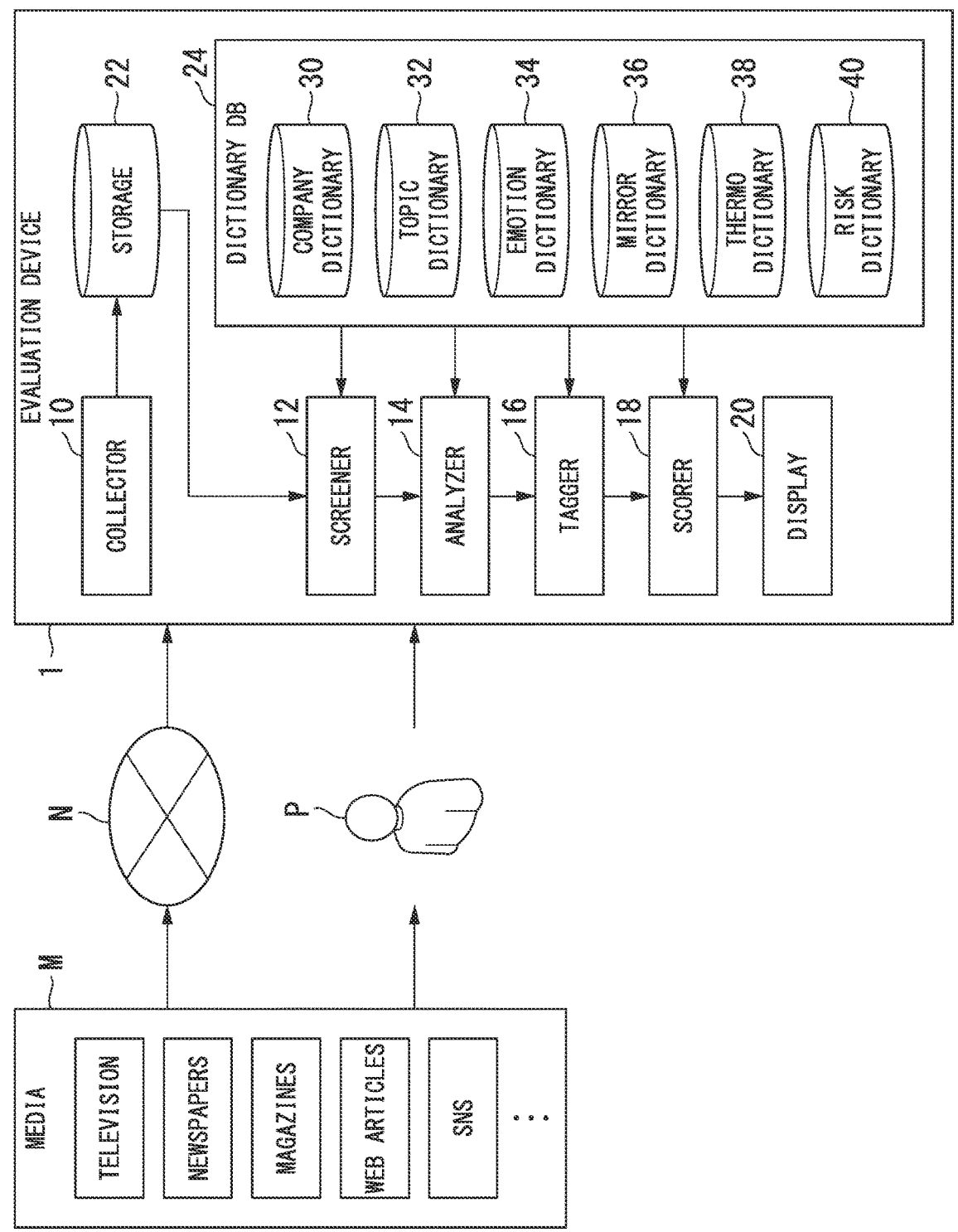
FIG. 1 is a functional block diagram showing an example of an evaluation device according to an embodiment.

FIG. 1 is a functional block diagram showing an example of an evaluation device 1 according to an embodiment of the present invention. The evaluation device 1 performs evaluation on a brand to be evaluated by collecting and analyzing data to be processed (hereinafter referred to as "processing target data") from media M (information media). The media M include, for example, TV, newspapers, magazines, web articles, weblogs, SNSs such as short posting services, and shareholder reports.

The evaluation device 1 calculates three values, i.e., a "mirror score (first index value)," a "thermo score (second index value)," and a "risk value (third index value)," as evaluation indices related to the brand. The "mirror score" is defined as an index indicating how the public thinks of a brand to be evaluated with regard to content that a company that owns the brand has defined to indicate how the company desires the brand to be seen by the public. The "mirror score" indicates the frequency of appearance of a term (a first term) indicating content expected by a company. By calculating this mirror score, it is possible to determine the gap between an image of the brand that the company expects and a response of the public.

The "thermo score" is an index indicating whether the feelings of the public could be enhanced by the activities of a company that owns a brand to be evaluated. The "thermo score" indicates the frequency of appearance of a term (a second term) indicating a response of the public (customer). By calculating this thermo score, it is possible to determine whether the feelings of the public on the brand to be evaluated could be enhanced or whether the support of the public could be obtained. The "risk value" is an index indicating the degree of risk that has occurred with regard to the brand to be evaluated. The "risk value" is calculated on the basis of both the frequency of appearance of a term (a third term) indicating the risk of a company or organization and the type of the medium M (information medium).

The evaluation device 1 includes, for example, a collector 10, a screener 12 (an extractor), an analyzer 14, a tagger 16, a scorer 18 (a calculator and a generator), a display 20, a storage 22, and a dictionary DB 24. The dictionary DB 24 includes, for example, a company dictionary 30, a topic dictionary 32, an emotion dictionary 34, a mirror dictionary 36 (a first storage), a thermo dictionary 38 (a second storage), and a risk dictionary 40 (a third storage).

The collector 10 collects processing target data from the medium M and stores the processing target data in the storage 22. The collector 10 collects processing target data, for example, via the Internet N. The collector 10 collects processing target data at predetermined time intervals such as daily, weekly, or the like. The medium M as a collection source may be determined in advance by a user of the evaluation device 1. The collector 10 may also perform a crawling process of periodically collecting documents or the like on the Internet which include predefined character strings. The evaluation device 1 may further include a receiver (not shown) for receiving an input by an operator P and the collector 10 may collect processing target data input to this receiver.

The screener 12 excludes processing target data unrelated to the brand to be evaluated from the processing target data collected by the collector 10. The screener 12 extracts data related to a brand preset by a company or an organization from data collected from the medium M (information medium). For example, the screener 12 reads dictionary data stored in the company dictionary 30. This dictionary data is that of the brand to be evaluated. Then, the screener 12 excludes processing target data including homophones of this brand. Further, for example, the screener 12 may exclude processing target data acquired from a predefined specific URL and exclude processing target data acquired from a weblog and SNS having a predefined specific ID and may also exclude data including a lot of the same text as abnormal data.

The analyzer 14 performs a morphological analysis process of dividing text included in the processing target data into word levels and associating brands having the same meaning with each other. For example, the analyzer 14 associates characters of the alphabetical notation, the kanji notation, the katakana notation, the hiragana notation, and the like indicating the same brand and processes them as data indicating the same brand. In addition, even when there are different data regarding the alphabetical notation such as uppercase letters, lowercase letters, and a mixture of uppercase and lowercase letters, the analyzer 14 may process the different data as data indicating the same brand. The analyzer 14 may also process text including errors (such as kanji conversion errors) as data indicating the brand to be evaluated. This makes it possible to compensate for variations of the notations.

The analyzer 14 performs a parsing process of determining a relationship between a modifier and a modificand of words included in the text and analyzing the strength of expression, multiple negation, a positive question, a modification relation, comparison, and dialect of each word included in the text. Analysis of the strength of expression is performed, for example, such that, when "extremely" in an expression "Product A is extremely good" and "slightly" in an expression "Product A is slightly good" are analyzed, the former "extremely" is analyzed as a stronger expression. Analysis of multiple negation is performed, for example, such that an expression including double negation "Product A is not bad" is analyzed as a positive expression.

Analysis of a positive question is performed, for example, such that a question sentence expressed with a positive intention "Is product A good?" is analyzed as a positive expression. Analysis of a modification relation is performed, for example, such that, even if the positions of a modifier and a modificand are reversed like an expression "Good is product A, isn't it?," the meaning of the expression is correctly analyzed. That is, the expression "Good is product A, isn't it?" is analyzed as a positive expression.

Analysis of comparison is performed such that, given an expression comparing current and previous models of product A "the previous model of product A was better," it is determined that the intention is to express that product A got worse and the expression is analyzed as a negative expression. Analysis of dialect is performed, for example, such that for a dialect word "sweet" in an expression "product A is sweet," it is determined that the dialect word has an intention to express a standard word "cute" and thus the meaning thereof is correctly analyzed. This expression "product A is sweet" is analyzed as a positive expression. By performing the parsing process in this manner, it is possible to improve the accuracy of semantic understanding.

The tagger 16 refers to the company dictionary 30, the topic dictionary 32, the emotion dictionary 34, the mirror dictionary 36, the thermo dictionary 38, and the risk dictionary 40 to tag a "company" tag, a "topic" tag, an "emotion" tag, a "mirror" tag, a "thermo" tag, or a "risk" tag to text included in each of a plurality of processing target data. Details of the tagging process will be described later.

The scorer 18 performs a scoring process of calculating a mirror score, a thermo score, and a risk value on the basis of the processing target data that has been subjected to the tagging process by the tagger 16. For example, the scorer 18 calculates a mirror score for a character string tagged with a combination of a "company" tag, a "topic" tag, and a "mirror" tag in the processing target data. Further, for example, the scorer 18 calculates a thermo score for a character string tagged with a combination of a "company" tag, a "topic" tag, and a "thermo" tag in the processing target data. Furthermore, for example, the scorer 18 calculates a risk value for a character string tagged with a combination of a "company" tag, a "topic" tag, and a "risk" tag in the processing target data. Moreover, for example, the scorer 18 calculates a risk value for a character string tagged with a combination of a "company" tag and a "risk" tag in the processing target data.

All or a part of the collector 10, the screener 12, the analyzer 14, the tagger 16, and the scorer 18 are realized by a processor (computer) executing a program (software). Alternatively, all or a part of these may be realized by hardware such as a large scale integration (LSI) or an application specific integrated circuit (ASIC) or may be realized by a combination of software and hardware.

The display 20 displays the mirror score, the thermo score, and the risk value calculated by the scorer 18. The user of the evaluation device 1 can evaluate the evaluation target brand by checking the mirror score, the thermo score, and the risk value displayed on the display 20. The display 20 includes, for example, a liquid crystal display or and organic electroluminescence (EL) display device.

The storage 22 stores the processing target data collected by the collector 10. The storage 22 stores, for example, the type of the media as a collection source and the processing target data in association with each other.

The dictionary DB 24 stores dictionary data used in various processes performed by the screener 12, the analyzer 14, the tagger 16, and the scorer 18. The storage 22 and the dictionary DB 24 are realized by a read only memory (ROM), a random access memory (RAM), a hard disk drive (HDD), a flash memory, or the like.

The company dictionary 30 stores dictionary data of brands owned by a company which are brands to be evaluated. The company dictionary 30 stores terms that feature the company, such as, for example, a company name, a product name, a service name, and the company president's name.

The topic dictionary 32 stores dictionary data of topics which are assumed to be attracting interest from the public. For example, when information such as a news release regarding a brand to be evaluated is announced to the public, the topic dictionary 32 stores a topic described in this news release. The topic dictionary 32 stores, for example, terms which are associated with the brand to be evaluated such as "new version," "release start," "announcement," and "world first reveal."

The emotion dictionary 34 stores dictionary data used for semantic analysis of the processing target data. The emotion dictionary 34 stores dictionary data necessary for the scorer 18 to perform positive and negative determination processes of the processing target data.

The mirror dictionary 36 stores dictionary data defining how the company desires their brand to be seen by the public and defining words which the company desires to represent the brand. FIG. 2 is a diagram showing an example of the dictionary data stored in the mirror dictionary 36 according to the present embodiment. The mirror dictionary 36 stores a term indicating at least one large classification, a term indicating at least one middle classification associated with each large classification, and keywords associated with each middle classification. These keywords are used as the dictionary data.

For example, in the example shown in FIG. 2, "trust" is stored as large classification 1, "safety" is stored as middle classification 1-1 associated with this large classification 1, and "high quality" is stored as middle classification 1-2 associated therewith. Further, "safe," "relief," and "trust" are stored as keywords associated with the middle classification 1-1 and "high quality," "safe," and "does not break" are stored as keywords associated with the middle classification 1-2. The mirror dictionary 36 need not have a data configuration of large classifications, middle classifications, and keywords, and may define only large classifications or may define more detailed classifications or may store only keywords without defining classifications.

The thermo dictionary 38 stores dictionary data for evaluating whether the feelings of the public could be enhanced by the activities of the company that owns the brand to be evaluated. FIG. 3 is a diagram showing an example of the dictionary data stored in the thermo dictionary 38 according to the present embodiment. In the example shown in FIG. 3, the thermo dictionary 38 stores "relief," "satisfaction," "like," and "expectation" as terms indicating positive feelings of the public. Also, the thermo dictionary 38 stores "anxiety," "dissatisfaction," "dislike," and "disappointment" as terms indicating negative feelings of the public which are opposite to the terms indicating positive feelings of the public. In addition, the thermo dictionary 38 may store keywords associated with the terms indicating feelings. For example, the thermo dictionary 38 may store, for example, "you should check it out," "looking forward to the future," and the like as keywords associated with "expectation".

The risk dictionary 40 stores dictionary data indicating risks of which the company should be aware concerning the brand to be evaluated. FIG. 4A is a diagram showing an example of the dictionary data stored in the risk dictionary 40 according to the present embodiment. FIG. 4B is a diagram showing another example of the dictionary data stored in the risk dictionary 40 according to the present embodiment. The risk dictionary 40 stores a term indicating at least one large classification, a term indicating at least one middle classification associated with each large classification, a term indicating at least one small classification associated with each middle classification, and keywords associated with each small classification. These keywords are used as the dictionary data.

For example, in the example shown in FIGS. 4A and 4B, "due to company" is stored as large classification 1, "management quality" is stored as middle classification 1-1 associated with this large classification 1, and "product quality" is stored as middle classification 1-2 associated therewith. Further, "performance" is stored as small classification 1-1-1 associated with the middle classification 1-1 and "personnel" is stored as small classification 1-1-2 associated therewith. Furthermore, "performance deterioration," "stock price plunge," and "illegal" are stored as keywords associated with the small classification 1-1-1 and "restructuring," "hard work," and "dismissal" are stored as keywords associated with the small classification 1-1-2. The risk dictionary 40 need not have a data configuration of large classifications, middle classifications, small classifications, and keywords, and may set only large classifications or only large and middle classifications or may define more detailed classifications or may store only keywords without defining classifications.

Figure 5:
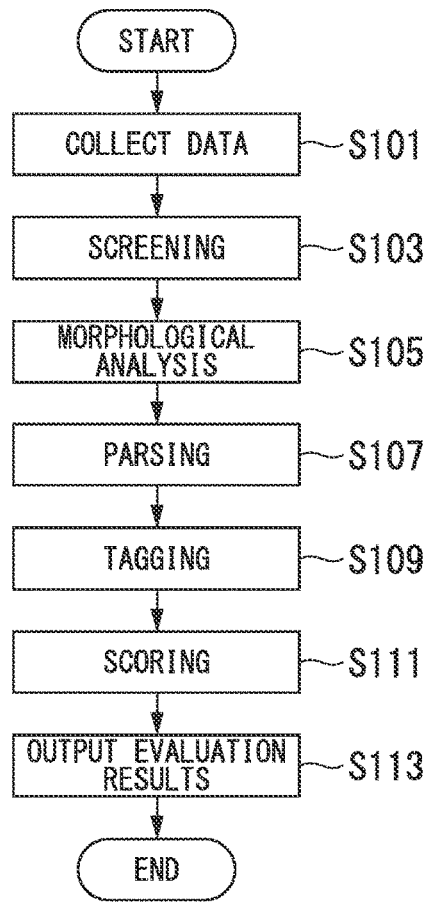
FIG. 5 is a flowchart showing an example of a flow of a process of the evaluation device according to the embodiment.

Next, the operation of the evaluation device 1 according to the present embodiment will be described. FIG. 5 is a flowchart showing an example of a flow of processes of the evaluation device 1 according to the present embodiment.

First, the collector 10 collects processing target data from medium M and stores the processing target data in the storage 22 (step S101). The collector 10 collects processing target data, for example, via the Internet N. The collector 10 collects processing target data at predetermined time intervals such as daily, weekly, or the like. The evaluation device 1 may further include a receiver (not shown) for receiving an input by an operator P and the collector 10 may collect processing target data input to this receiver.

Next, the screener 12 reads the processing target data stored in the storage 22 and performs a screening process of excluding data unrelated to the brand to be evaluated (step S103). For example, the screener 12 reads dictionary data (a brand to be evaluated) from the company dictionary 30 and excludes data including homophones of this brand.

Next, the analyzer 14 performs a morphological analysis process of dividing text included in the processing target data into word levels and associating brands having the same meaning with each other (step S105). For example, the analyzer 14 associates characters of the alphabetical notation, the kanji notation, the katakana notation, the hiragana notation, and the like indicating the same brand and handles them as data indicating the same brand and compensates for variations of the notations.

Next, the analyzer 14 performs a parsing process of determining a relationship between a modifier and a modificand of words included in the text and analyzing the strength of expression, multiple negation, a positive question, a modification relation, comparison, and dialect of each word included in the text (step S107).

Next, the tagger 16 tags a "company" tag, a "topic" tag, an "emotion" tag, a "mirror" tag, a "thermo" tag, or a "risk" tag to text included in each of a plurality of processing target data (step S109).

Figure 6:
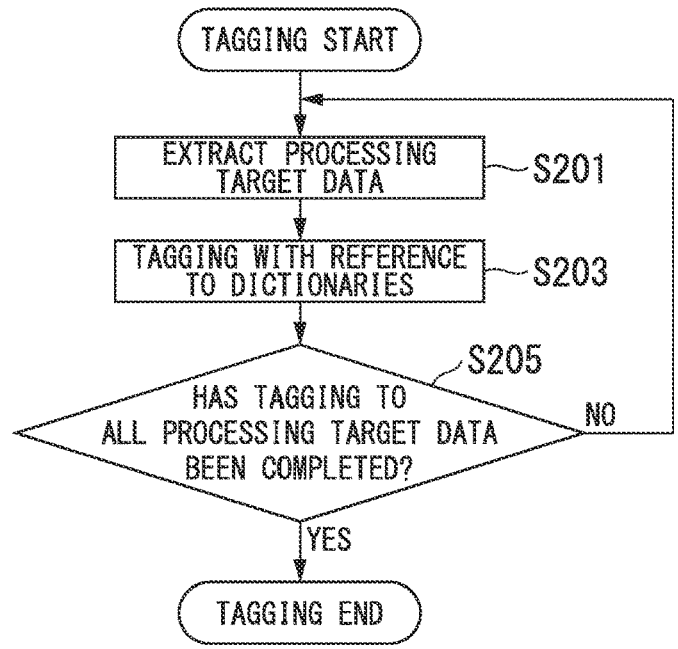
FIG. 6 is a flowchart showing an example of a flow of a tagging process of the evaluation device according to the embodiment.

FIG. 6 is a flowchart showing an example of a flow of the tagging process (step S109) of the evaluation device 1 according to the present embodiment. First, the tagger 16 extracts one processing target data from processing target data that have been subjected to the parsing process by the analyzer 14 (step S201).

Next, the tagger 16 tags a "company" tag, a "topic" tag, an "emotion" tag, a "mirror" tag, a "thermo" tag, and a "risk" tag to text included in each of the processing target data (step S203). When a character string of the dictionary data stored in the company dictionary 30 is included in the processing target data, the tagger 16 assigns a "company" tag to the character string in the processing target data. When a character string of the dictionary data stored in the topic dictionary 32 is included in the processing target data, the tagger 16 assigns a "topic" tag to the character string in the processing target data. When a character string of the dictionary data stored in the emotion dictionary 34 is included in the processing target data, the tagger 16 assigns an "emotion" tag to the character string in the processing target data. When a character string of the dictionary data stored in the mirror dictionary 36 is included in the processing target data, the tagger 16 assigns a "mirror" tag to the character string in the processing target data. When a character string of the dictionary data stored in the thermo dictionary 38 is included in the processing target data, the tagger 16 assigns a "thermo" tag to the character string in the processing target data. When a character string of the dictionary data stored in the risk dictionary 40 is included in the processing target data, the tagger 16 assigns a "risk" tag to the character string in the processing target data.

Figure 7:
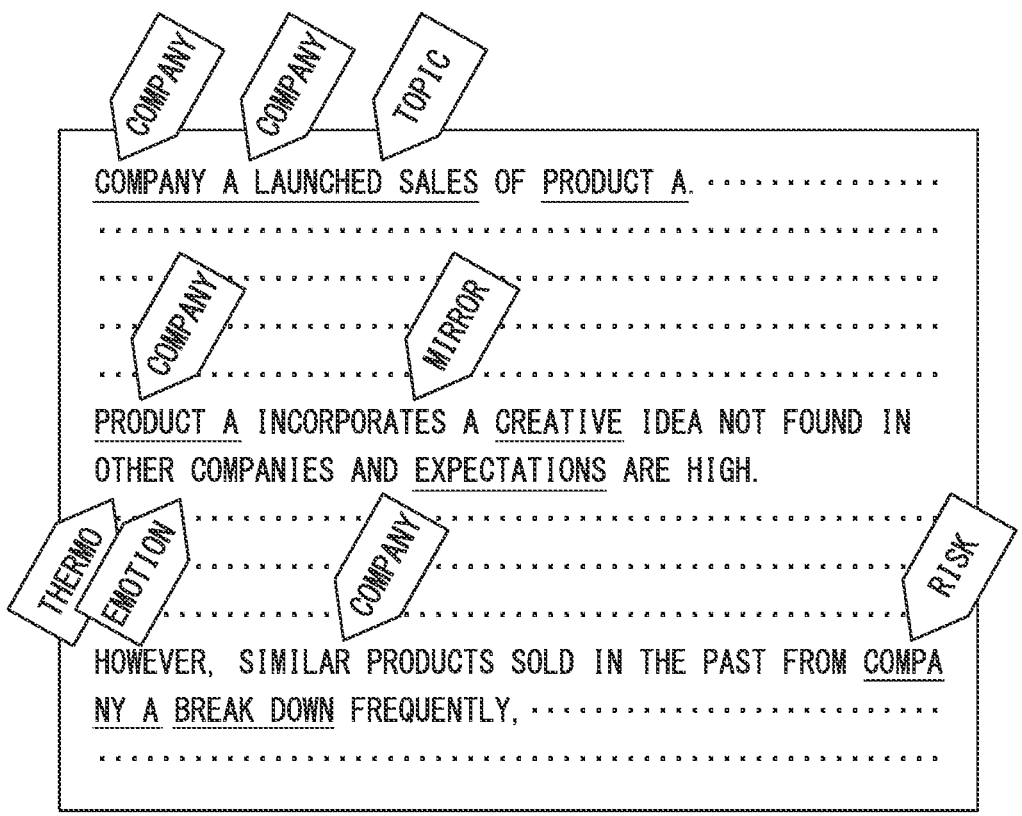
FIG. 7 is a diagram showing an example of processing target data that has been subjected to a tagging process according to the embodiment.

FIG. 7 is a diagram showing an example of processing target data which has been subjected to the tagging process according to the present embodiment. In the example shown in FIG. 7, a "company" tag is assigned to character strings "company A" and "product A," a "topic" tag is assigned to a character string "launch sales," a "mirror" tag is assigned to a character string "creative," a "thermo" tag and an "emotion" tag are assigned to a character string "expectation," and a "risk" tag is assigned to a character string "break down".

Next, the tagger 16 determines whether or not the tagging process has been completed for all processing target data (step S205). When the tagger 16 determines that the tagging process has not been completed for all processing target data, the tagger 16 extracts processing target data which has not been subjected to the tagging process and performs a tagging process on the extracted processing target data. On the other hand, when the tagger 16 determines that the tagging process has been completed for all processing target data, the tagger 16 completes the tagging process.

Next, the scorer 18 performs a scoring process of calculating a mirror score, a thermo score, and a risk value on the basis of the processing target data tagged by the tagger 16 (step S111).

Figure 8:
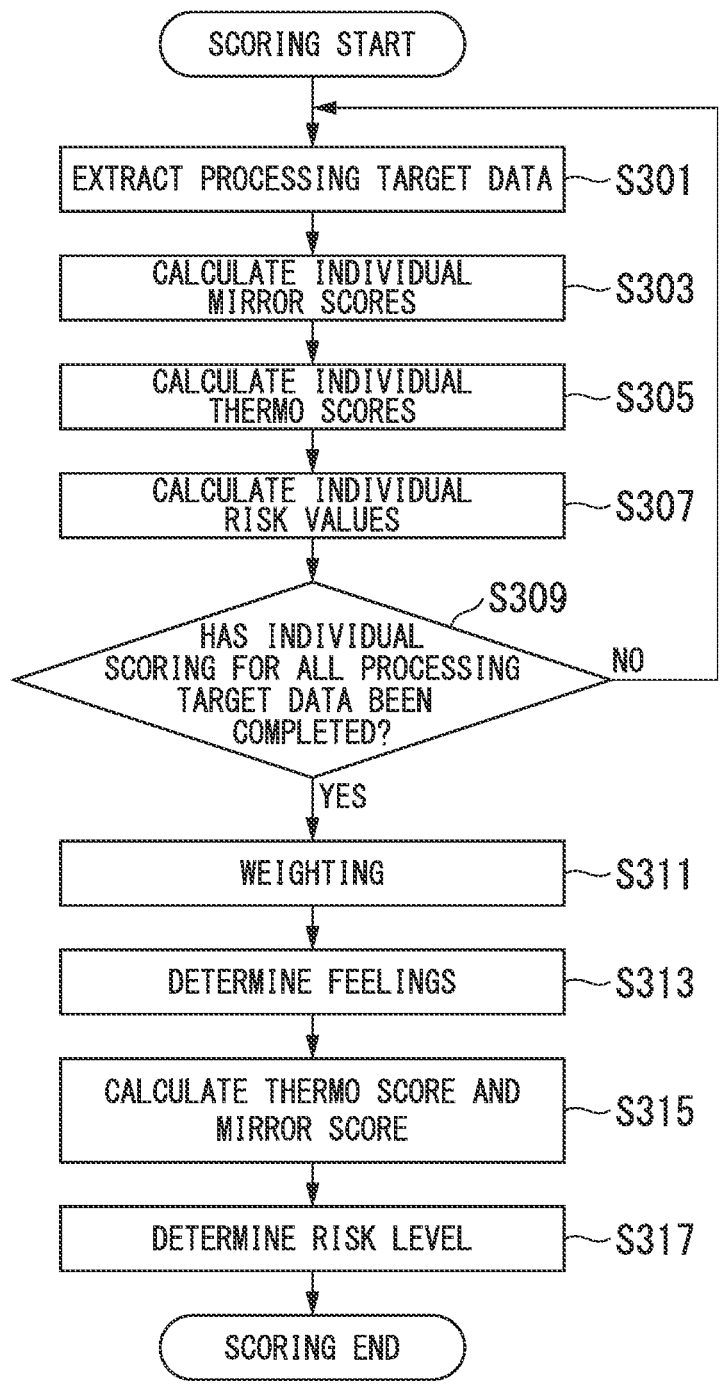
FIG. 8 is a flowchart showing an example of a flow of a scoring process of the evaluation device according to the embodiment.

FIG. 8 is a flowchart showing an example of a flow of the scoring process (step S111) of the evaluation device 1 according to the present embodiment. First, the scorer 18 extracts one processing target data from processing target data that have been subjected to the tagging process by the tagger 16 (step S301).

Next, the scorer 18 calculates respective mirror scores (hereinafter referred to as "individual mirror scores") of processing target data, each of which has been tagged with a combination of a "company" tag(s), a "topic" tag(s) and a "mirror" tag(s) (step S303). For example, the scorer 18 counts the number of "mirror" tags and calculates an individual mirror score with one point per "mirror" tag.

Next, the scorer 18 calculates respective thermo scores (hereinafter referred to as "individual thermo scores") of processing target data, each of which has been tagged with a combination of a "company" tag(s), a "topic" tag(s) and a "thermo" tag(s) (step S305). For example, the scorer 18 counts the number of "thermo" tags and calculates an individual thermo score with one point per "thermo" tag.

FIG. 9 is a diagram showing an example of the scoring process of the evaluation device 1 according to the present embodiment. In the example shown in FIG. 9, processing target data 1 includes a character string "new version" to which a "topic" tag is assigned, a character string "product A" to which a "company" tag is assigned, a character string "cool" to which a "mirror" tag (of a large classification "joy") is assigned, and a character string "you should check it out" to which a "thermo" tag (corresponding to a keyword associated with "expectation") is assigned. In this case, the scorer 18 calculates an individual mirror score as "1.0" with a combination of "product A," "new version," and "joy". Further, the scorer 18 calculates an individual thermo score as "1.0" with a combination of "product A," "new version," and "expectation".

Processing target data 2 includes a character string "new version" to which a "topic" tag is assigned, a character string "cool" to which a "mirror" tag (of a large classification "joy") is assigned, and a character string "you should check it out" to which a "thermo" tag (corresponding to a keyword associated with "expectation") is assigned. In this case, since there is no character string to which a "company" tag is assigned, the scorer 18 sets an individual mirror score and an individual thermo score to "0.0".

Processing target data 3 includes a character string "new version" to which a "topic" tag is assigned, character strings "product A" and "company A" to which "company" tags are assigned, a character string "cool" to which a "mirror" tag (of a large classification "joy") is assigned, and a character string "you should check it out" to which a "thermo" tag (corresponding to a keyword associated with "expectation") is assigned. That is, the processing target data 3 includes two character strings "product A" and "company A" to which "company" tags are assigned. In this case, the scorer 18 calculates an individual mirror score and an individual thermo score for each of the two character strings.

The processing target data 3 includes a positive expression "the exhibition was very cool," but this may sometimes not express the product A or the company A positively. That is, this can also be analyzed such that the expression "the exhibition was very cool" is a positive expression only in a manner with regard to "exhibition". In this case, the scorer 18 calculates individual mirror scores and individual thermo scores to be lower than those for the process target data 1 which directly expresses the product A positively. For example, the scorer 18 calculates an individual mirror score as "0.5" with a combination of "product A," "new version" and "joy," and calculates an individual mirror score as "0.5" with a combination of "company A," "new model" and "joy". In addition, the scorer 18 calculates an individual thermo score as "0.5" with a combination of "product A," "new version" and "expectation" and calculates an individual thermo score as "0.5" with a combination of "company A," "new version" and "expectation".

Next, the scorer 18 calculates respective risk values (hereinafter referred to as "individual risk values") of processing target data, each of which has been tagged with a combination of a "company" tag(s), a "topic" tag(s) and a "risk" tag(s) (step S307). For example, the scorer 18 counts the number of "risk" tags and performs scoring with one point per "risk" tag.

Next, the scorer 18 determines whether or not the individual scoring process has been completed for all processing target data (step S309). When the scorer 18 determines that the individual scoring process has not been completed for all processing target data, the scorer 18 extracts processing target data which has not been subjected to the individual scoring process and performs an individual scoring process on the extracted processing target data.

On the other hand, when the scorer 18 has determines that the individual scoring process has been completed for all processing target data, the scorer 18 performs a weighting process on the basis of the type of the collection source of each processing target data (step S311). The scorer 18 weights both data including terms stored in the mirror dictionary 36 and data including terms stored in the thermo dictionary 38 on the basis of the type of the medium M (information medium) and calculates mirror and thermo scores which will be described later. For example, an average amount of statements for a brand to be evaluated per day for each medium is calculated on the basis of past statistical data and weighting is performed such that the influences of all media are uniform. For example, when the weight of a newspaper is set to "1" as a reference value, a greater weight "2" than that of a newspaper is set for a television which has a small amount of statements compared to a newspaper. A smaller weight "0.1" than that of the newspaper is set for an SNS which has a large amount of statements compared to the newspaper.

Next, the scorer 18 performs a feelings determination process for determining whether the content of the processing target data is a positive expression or a negative expression on the basis of an "emotion" tag assigned to the processing target data (step S313). The scorer 18 determines whether each of the processing target data indicates positive content or negative content with regard to each mirror score and each thermo score.

For example, when the number of parts indicating positive expressions (i.e., the number of emotion tags with positive expressions) in a processing target data is greater than the number of parts indicating negative expressions (i.e., the number of emotion tags with negative expressions), the scorer 18 determines that the processing target data has a positive expression as a whole. Further, when the number of parts indicating negative expressions in a processing target data is greater than the number of parts indicating positive expressions, the scorer 18 determines that the processing target data has a negative expression as a whole. Furthermore, when the number of parts indicating positive expressions in a processing target data is equal to the number of parts indicating negative expressions, the scorer 18 determines that the processing target data has a neutral expression as a whole. In addition, when no "emotion" tags are assigned to a processing target data, the scorer 18 determines that the processing target data is emotionless.

Next, the scorer 18 calculates a final thermo score and a final mirror score on the basis of the processing target data that has been subjected to the feelings determination process (step S315). For example, the scorer 18 calculates, for each brand to be evaluated, the sum of individual mirror scores of processing target data determined to have positive expressions and the sum of individual mirror scores of processing target data determined to have negative expressions. The scorer 18 calculates, as a final mirror score, a value obtained by subtracting the sum of the individual mirror scores of the processing target data determined to have negative expressions from the sum of the individual mirror scores of the processing target data determined to have positive expressions.

Further, for example, the scorer 18 calculates, for each brand to be evaluated, the sum of individual thermo scores of processing target data determined to have positive expressions and the sum of individual thermo scores of process target data determined to have negative expressions. The scorer 18 calculates, as a final thermo score, a value obtained by subtracting the sum of the individual thermo scores of the processing target data determined to have negative expressions from the sum of the individual thermo scores of the processing target data determined to have positive expressions. The scorer 18 stores the calculated mirror and thermo scores in the storage 22.

Next, the scorer 18 calculates a final risk value on the basis of the processing target data that has been subjected to the feelings determination process and determines a risk level (step S317). The risk level is determined, for example, such that the risk is "high," "middle," or "low" with reference to predetermined threshold values. In this case, the threshold values may be set for each classification in the risk dictionary shown in FIGS. 4A and 4B. For example, even when risk values are the same, a threshold value for "failure" of the small classification 1-2-1 is set to be lower than for "performance" of the small classification 1-1-1 if the risk situation of "failure" of the small classification 1-2-1 is considered more serious than that of "performance" of the small classification 1-1-1. Thus, the scoring process is terminated.

Figure 10:
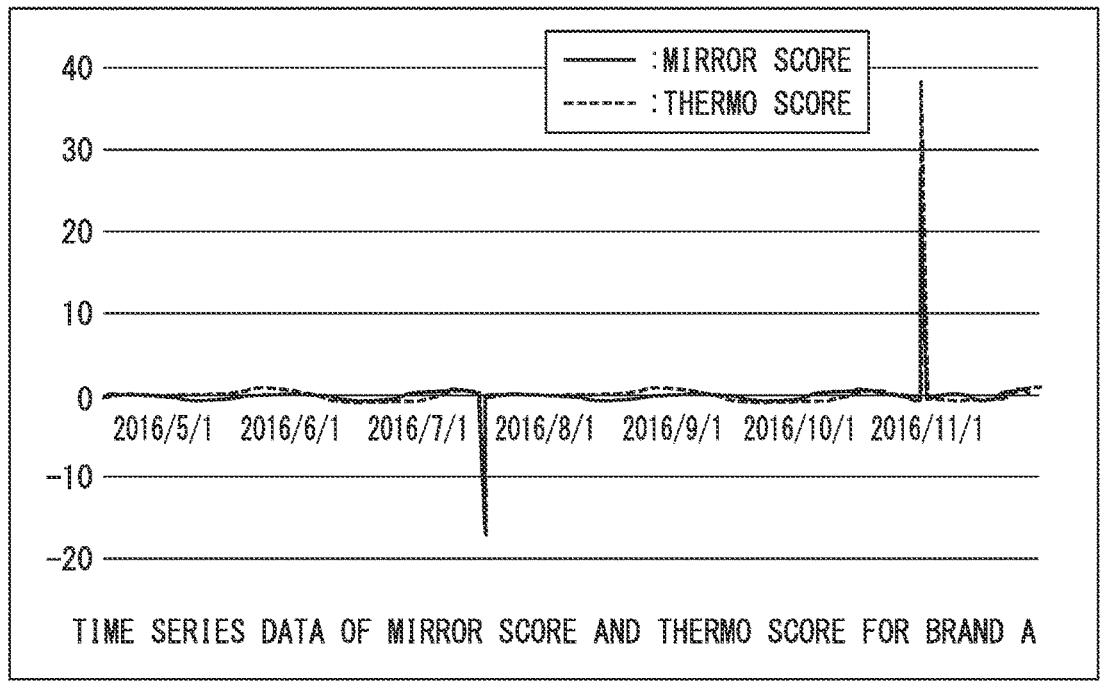
FIG. 10 is a diagram showing an example of time series data of a mirror score and a thermo score for brand A according to the embodiment.
Figure 11:
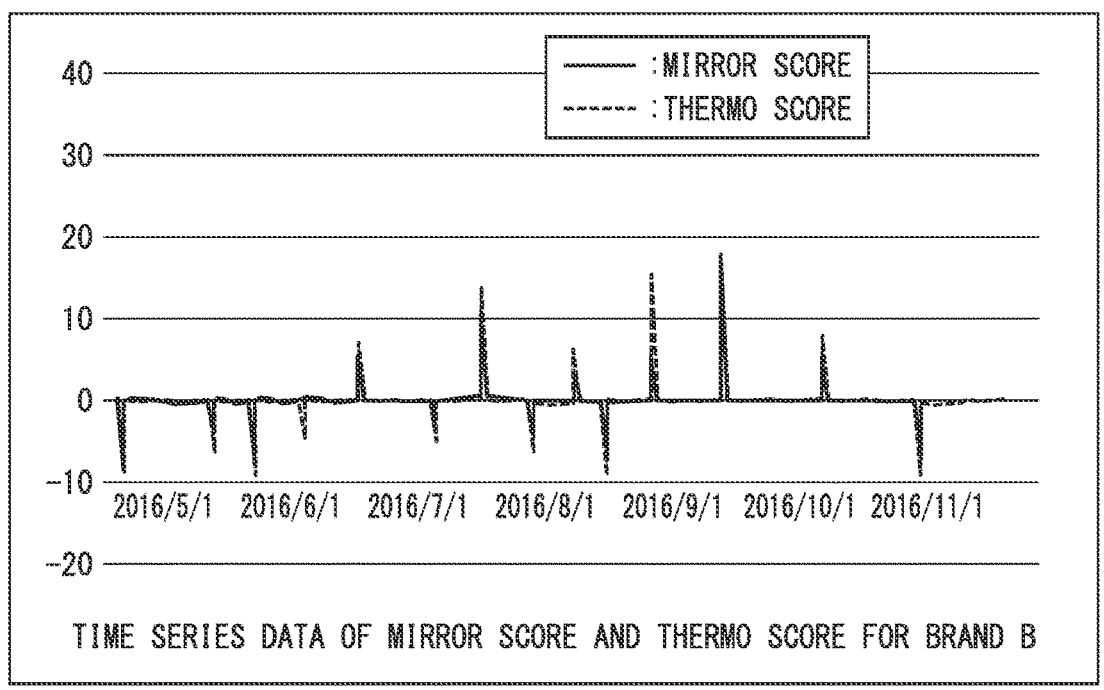
FIG. 11 is a diagram showing an example of time series data of a mirror score and a thermo score for brand B according to the embodiment.

Next, the scorer 18 performs an evaluation result output process of causing the display 20 to display the calculated mirror score, thermo score, risk value, or the like (step S113). The scorer 18 generates information allowing display of an image comparing the mirror score, the thermo score, and the risk value. FIG. 10 is a diagram showing an example of time series data of a mirror score and a thermo score for brand A according to the present embodiment. FIG. 11 is a diagram showing an example of time series data of a mirror score and a thermo score for brand B according to the present embodiment. In the example shown in FIG. 10, it can be seen that values of the mirror score and the thermo score were greatly reduced, causing a peak, on Jul. 20, 2016 and the values of the mirror score and the thermo score were greatly increased, causing a peak, on Nov. 1, 2016, and the values of the mirror score and the thermo score are around 0 in other periods. Further, in the example shown in FIG. 11, it can be seen that peaks of the mirror score and the thermo score occur frequently but the value of each peak is smaller than the value of each peak for the brand A shown in FIG. 10.

Figure 12:
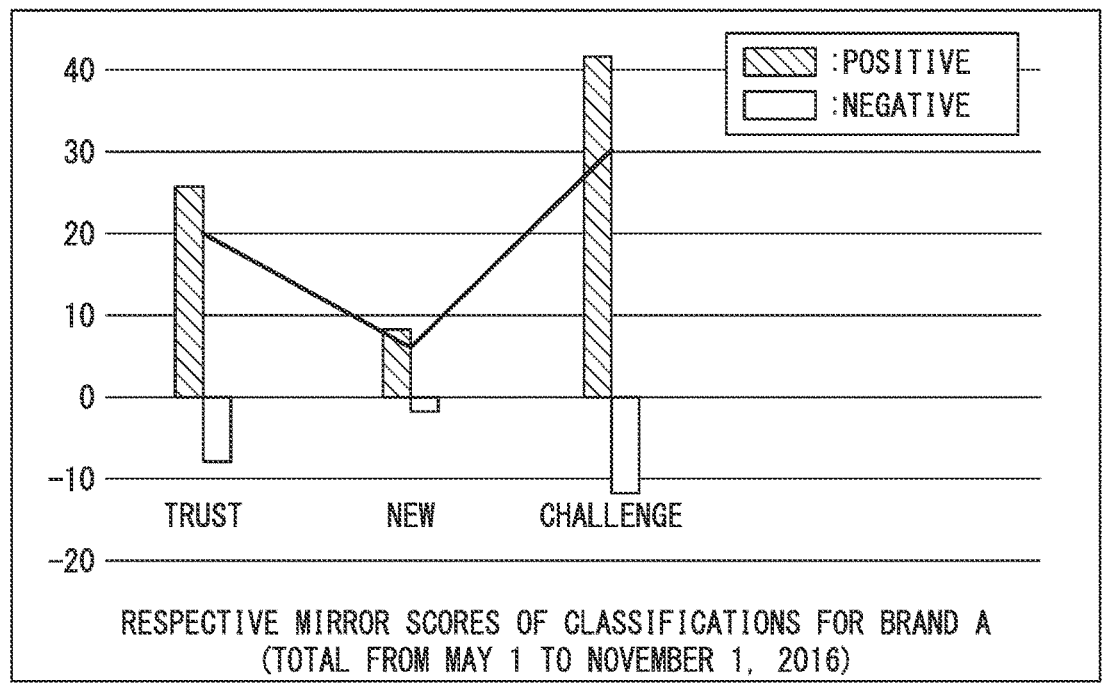
FIG. 12 is a diagram showing an example of respective mirror scores of classifications for brand A according to the embodiment.

FIG. 12 is a diagram showing an example of respective mirror scores of classifications for brand A according to the present embodiment. In the example shown in FIG. 12, an average value per day of mirror scores of processing target data determined to have positive expressions and an average value per day of mirror scores of processing target data determined to have negative expressions from May 1 to Nov. 1, 2016 are shown as a bar graph for each of large classification 1 (trust), large classification 2 (new), and large classification 3 (challenge) stored in the mirror dictionary shown in FIG. 2. The mirror scores of the processing target data determined to have negative expressions are shown as negative values. A line graph shows a value obtained by subtracting the average value of the mirror scores of the process target data determined to have negative expressions from the average value of the mirror scores of the processing target data determined to have positive expressions. This allows the user of the evaluation device 1 to check the respective mirror scores of classifications.

Figure 13:
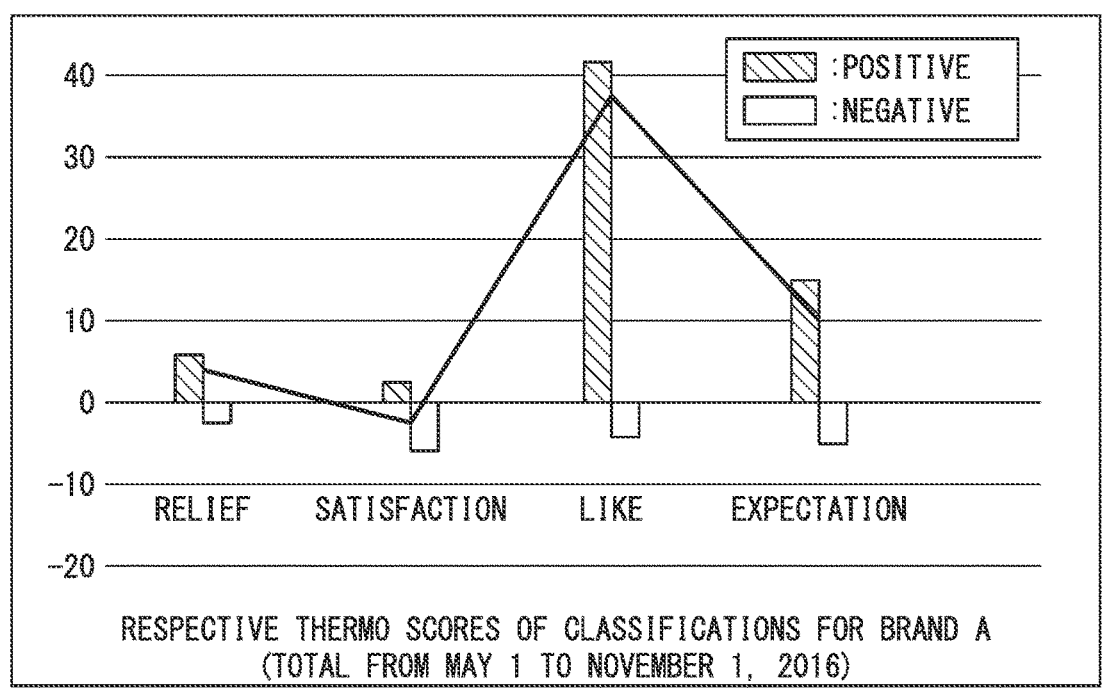
FIG. 13 is a diagram showing an example of respective thermo scores of classifications for brand A according to the embodiment.

FIG. 13 is a diagram showing an example of respective thermo scores of classifications for brand A according to the present embodiment. In the example shown in FIG. 13, an average value per day of thermo scores of processing target data determined to have positive expressions and an average value per day of thermo scores of processing target data determined to have negative expressions from May 1 to Nov. 1, 2016 are shown as a bar graph for each of "relief," "satisfaction," "like," and "expectation" stored in the thermo dictionary shown in FIG. 3. A line graph shows a value obtained by subtracting the average value of the thermo scores of the processing target data determined to have negative expressions from the average value of the thermo scores of the processing target data determined to have positive expressions. This allows the user of the evaluation device 1 to check the respective thermo scores of classifications.

Figure 14:
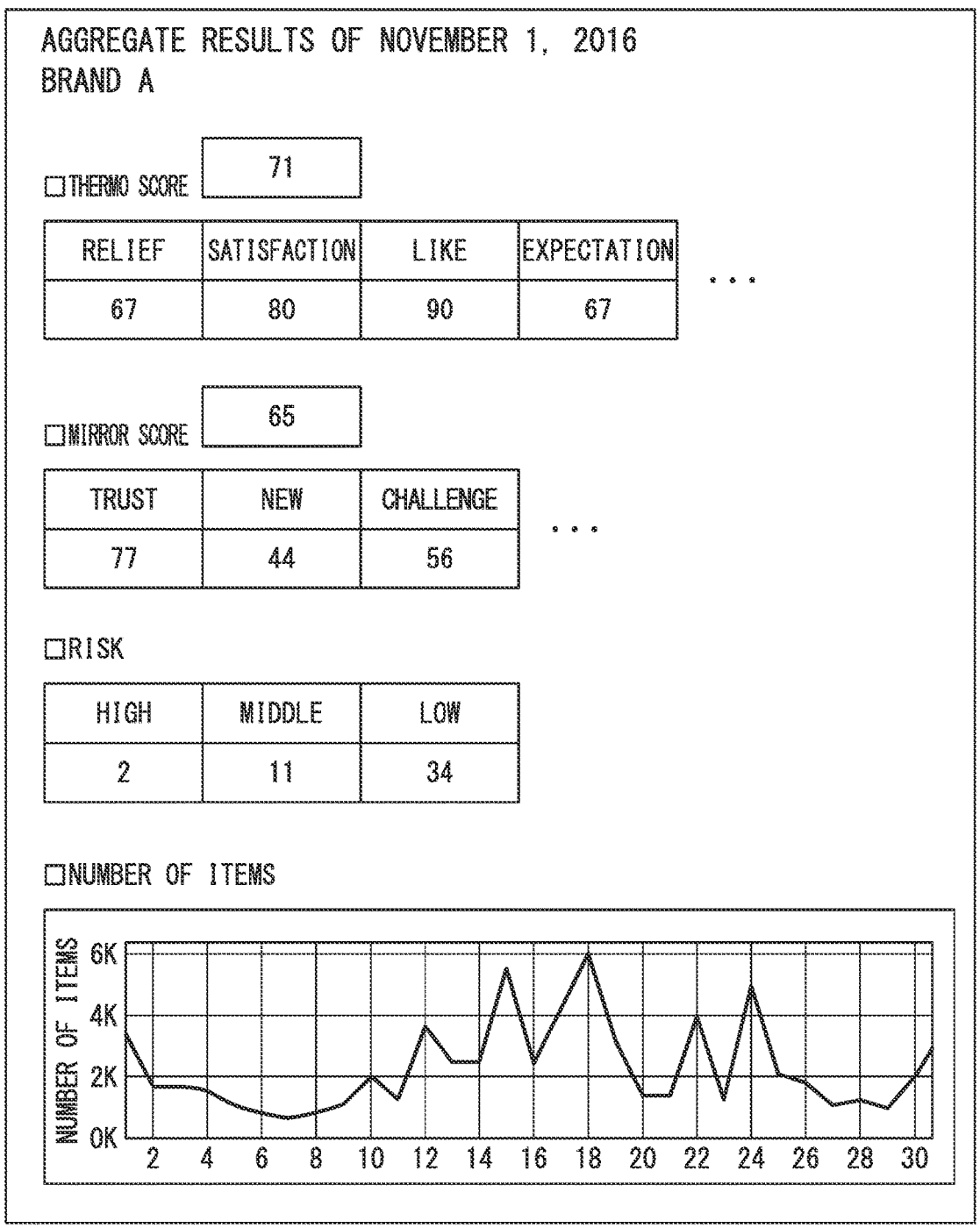
FIG. 14 is a diagram showing an example of time series data of a thermo score, a mirror score, a risk value, and the number of processing target data concerning brand A according to the embodiment.

FIG. 14 is a diagram showing an example of time series data of a thermo score, a mirror score, a risk value, and the number of processing target data concerning brand A according to the present embodiment. FIG. 14 shows that an average value of respective thermo scores of classifications of a specific day (Nov. 1, 2016) is "71" and an average value of respective mirror scores of classifications is "65". FIG. 14 also shows that, regarding the risk level of the risk value, the number of items determined to be "high" is "2," the number of items determined to be "middle" is "11," and the number of items determined to be "low" is "34". In FIG. 14, a line graph shows the number of processing target data for the past 30 days related to the brand A. This allows the user of the evaluation device 1 to check the thermo score, the mirror score, and the risk level regarding the brand A. Although FIG. 14 shows an example of displaying the thermo score, the mirror score, and the risk value of a specific day, it is also possible to display the thermo score, the mirror score, and the risk value in any period such as a week or a month.

Figure 15:
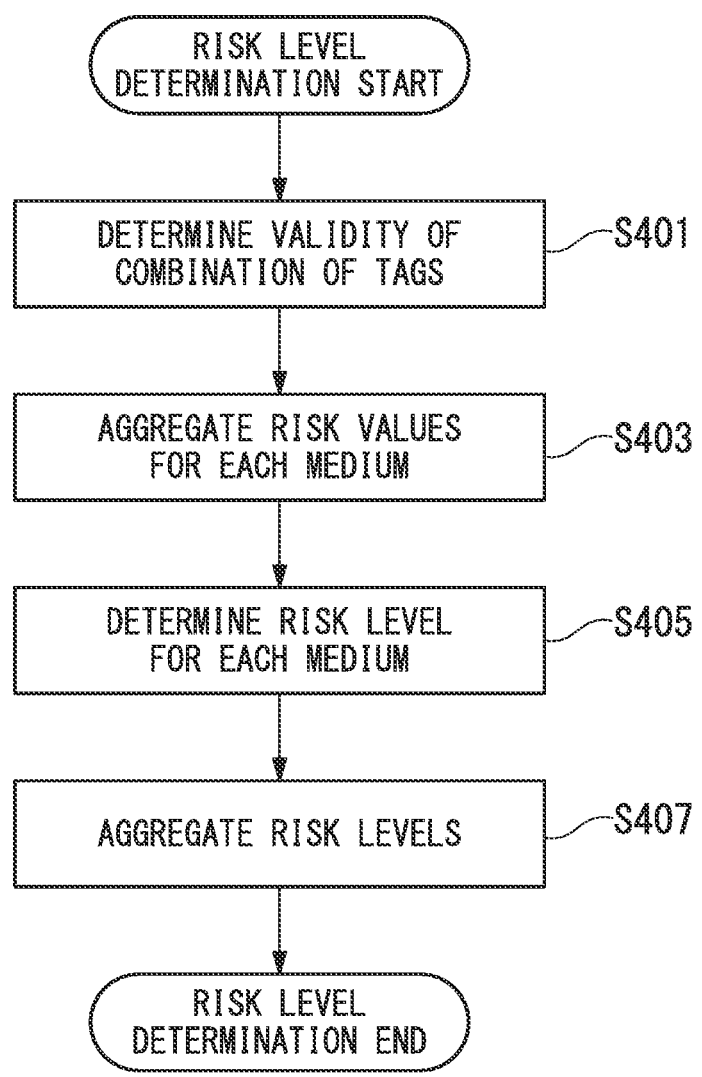
FIG. 15 is a diagram showing another example of a risk level determination process of the evaluation device according to the embodiment.

FIG. 15 is a diagram showing another example of the risk level determination process of the evaluation device 1 according to the present embodiment. First, the scorer 18 determines the validity of a combination of tags assigned to each of a plurality of processing target data (step S401). For example, the scorer 18 determines whether or not tags including a combination of a "company" tag(s) and a "risk" tag(s) are assigned to each of the processing target data. The scorer 18 sets the processing target data as a target of the risk level determination when tags including a combination of a "company" tag(s) and a "risk" tag(s) are assigned to the processing target data. On the other hand, the scorer 18 excludes the processing target data from targets of the risk level determination when tags not including a combination of a "company" tag(s) and a "risk" tag(s) are assigned to the processing target data.

Even when tags including a combination of a "company" tag(s) and a "risk" tag(s) are assigned to the processing target data, the scorer 18 excludes the processing target data from the targets of the risk level determination when it is determined through the feelings determination process described above that the processing target data has a positive expression.

Next, the scorer 18 aggregates risk values for each medium M of character strings associated with a "company" tag for a process target data which is a target of the risk level determination (step S403). Next, for each of the character strings associated with a "company" tag, the scorer 18 determines, for example, whether the risk level is "high," "middle," or "low" with reference to predetermined threshold values (step S405). This threshold values are set for each classification in the risk dictionary shown in FIG. 4A and FIG. 4B for each medium M.

For example, a first threshold value associated with a risk level of "low," a second threshold value associated with a risk level of "middle" (first threshold value<second threshold value), a third threshold value associated with a risk level of "high" (second threshold value<third threshold value) are set with respect to "failure" of the small classification 1-2-1 shown in FIGS. 4A and 4B for each medium M (e.g., "newspapers," "television," "web articles," "weblogs," and "SNSs"). Since "web articles," "weblogs," and "SNSs" have a large amount of statements compared to "newspaper" and "television," a higher threshold value than for "newspapers" and "television" may be set for "web articles," "weblogs," and "SNSs". For example, the scorer 18 determines that the risk level is "high" when the aggregate of the risk values is equal to or greater than the third threshold value, determines that the risk level is "middle" when the aggregate of the risk values is equal to or greater than the second threshold value and less than the third threshold value, and determines that the risk level is "low" when the aggregate of the risk values is equal to or greater than the first threshold value and less than the second threshold value. The scorer 18 may determine that there is no risk when the aggregate of the risk values is less than the first threshold value.

Next, the scorer 18 aggregates respective risk levels determined for each medium M of character strings associated with a "company" tag (step S407). For example, the scorer 18 uses numerical values associated with the risk levels of "high," "middle," and "low". For example, values decreasing in the order of the risk levels of "high," "middle," and "low" are set as the numerical values associated with the risk levels of "high," "middle," and "low". The scorer 18 calculates the sum (aggregate) of the numerical values associated with the respective risk levels determined for each medium of the character strings associated with a "company" tag.

The scorer 18 aggregates results of determination of the risk levels through the cross media as described above and determines a final risk level on the basis of the aggregate. For example, with respect to each of the character strings associated with a "company" tag, the scorer 18 determines a final risk level of "high," "middle," "low," or "safety" on the basis of predetermined threshold values.

The scorer 18 may generate a heat map in which the final risk level determined by the scorer 18 is represented by a color. In this heat map, for example, character strings associated with a "company" tag (i.e., character strings of dictionary data stored in the company dictionary 30) are arranged in a column direction and classifications in the risk dictionary are arranged in a row direction. The final risk level determined by the scorer 18 is one cell of this heat map.

The calculated mirror scores, thermo scores, and risk values may also be mapped in a three-dimensional space and evaluation values may then be calculated with a support vector machine.

According to the evaluation device of the present embodiment described above, it is possible to evaluate the gap between an image of the brand expected by the company and a response of the public and to appropriately evaluate how the public has responded to activities performed by the company. It is also possible to comprehensively and uniformly evaluate processing target data collected from various media. In addition, when evaluating the gap between the image of the brand and the response of the public, it is possible to appropriately perform the evaluation by incorporating the probability of information being exposed through the media and further to evaluate the degree of risk of the company.

Although modes for carrying out the present invention have been described above by way of embodiments, the present invention is not limited to these embodiments at all and various modifications and substitutions may be made without departing from the spirit of the present invention.

What is claimed is:

1. An evaluation device comprising:
at least one storage storing a company dictionary, a first dictionary, a second dictionary, and a third dictionary,
the company dictionary including at least one term related to a brand of a company or an organization,
the first dictionary including at least one first term indicating content expected by the company or the organization as a term indicating the brand, the at least one first term being associated with respective first classifications,
the second dictionary including at least one second term indicating a response of a customer with respect to the brand, the at least one second term being associated with respective second classifications,
the third dictionary including at least one third term used for semantic analysis; and
at least one processor configured to execute at least one program to:
collect target data, via a plurality of information mediums;
screen the target data excluding data unrelated to the brand to be evaluated using the company dictionary;
parse the target data to divide text included in the target data into word levels and associate brands having the same meaning with each other and determine relationships between each word included in the target data, wherein the relationships include one or more of analyzing the strength of expression, multiple negation, a positive question, a modification relation, comparison, or dialect of each word included in the text;
extract the target data that has been subjected to parsing for each brand;
tag to text included in the target data a first tag on the basis of the company dictionary, a second tag on the basis of the first classifications of the first dictionary, a third tag on the basis of the second classifications of the second dictionary, and a fourth tag on the basis of semantic analysis of the third dictionary;
in response to determining that tagging has been completed for all target data:
calculate first individual index values for target data having first text tagged with a combination of the first tag and the second tag in the target data for the respective first classifications;
calculate second individual index values for target data having second text tagged with a combination of the first tag and the third tag in the extracted target data for the respective second classifications;
weight the each first individual index value and each second individual index value on the basis of a type of the information medium of a collection source of each of the first text and the second text such that the influence of the information mediums are uniform;
perform a feelings determination process for each first individual index value and each second individual index value by determining whether the content of each of the first text and the second text is a positive expression or a negative expression on the basis of the fourth tag assigned to the first text or the second text;
calculate for each brand a first final index value based on a sum of the weighted first individual index values and the positive expressions or negative expressions;
calculate for each brand a second final index value based on a sum of the weighted second individual index values and the positive expressions or negative expressions; and generate information allowing display of a time series comparison of the first final index value and the second final index value.

2. The evaluation device according to claim 1, wherein the at least one processor is further configured to execute the at least one program to determine whether each data collected from the information medium indicates positive content or negative content with regard to each of the first final index value and the second final index value.

3. The evaluation device according to claim 1,
wherein the at least one processor is further configured to execute the at least one program to determine whether each data collected from the information medium indicates positive content or negative content with regard to each of the first final index value for the respective first classifications and the second final index value for the respective second classifications,
wherein the display comprises
a first diagram comprising a first line graph showing a value obtained by subtracting an average value of the first values of the data determined to indicate negative content from an average value of the first values of the data determined to indicate positive content, and
a second diagram comprising a second line graph showing a value obtained by subtracting an average value of the second values of the data determined to indicate negative content from an average value of the second values of the data determined to indicate positive content.

4. An evaluation method comprising:
collecting target data, via a plurality of information mediums;
screening the target data excluding data unrelated to a brand to be evaluated using a company dictionary that includes at least one term related to the brand of a company or organization;
parsing the target data to divide text included in the target data into word levels and associate brands having the same meaning with each other and determine relationships between each word included in the target data, wherein the relationships include one or more of analyzing the strength of expression, multiple negation, a positive question, a modification relation, comparison, or dialect of each word included in the text;
extracting the target data that has been subjected to parsing for each brand;
tagging to text included in the target data a first tag on the basis of the company dictionary, a second tag on the basis of first classifications of a first dictionary including at least one first term indicating content expected by the company or the organization as a term indicating the brand, a third tag on the basis of second classifications of a second dictionary including at least one second term indicating a response of a customer with respect to the brand, and a fourth tag on the basis of semantic analysis of a third dictionary including at least one third term used for the semantic analysis, the at least one first term being associated with respective first classifications, the at least one second term being associated with respective second classifications;
in response to determining that tagging has been completed for all target data:
calculating first individual index values for target data having first text tagged with a combination of the first tag and the second tag in the target data for the respective first classifications;
calculating second individual index values for target data having second text tagged with a combination of the first tag and the third tag in the extracted target data for the respective second classifications;
weighting the each first individual index value and each second individual index value on the basis of a type of the information medium of a collection source of each of the first text and the second text such that the influence of the information mediums are uniform;
performing a feelings determination process for each first individual index value and each second individual index value by determining whether the content of each of the first text and the second text is a positive expression or a negative expression on the basis of the fourth tag assigned to the first text or the second text;
calculating for each brand a first final index value based on a sum of the weighted first individual index values and the positive expressions or negative expressions;
calculating for each brand a second final index value based on a sum of the weighted second individual index values and the positive expressions or negative expressions; and
generating information allowing display of a time series comparison of the first final index value and the second final index value.

5. A non-transitory computer-readable storage medium storing an evaluation program, which when executed by a computer, causes the computer to execute:
collecting target data, via a plurality of information mediums;
screening the target data excluding data unrelated to a brand to be evaluated using a company dictionary that includes at least one term related to the brand of a company or organization;
parsing the target data to divide text included in the target data into word levels and associate brands having the same meaning with each other and determine relationships between each word included in the target data, wherein the relationships include one or more of analyzing the strength of expression, multiple negation, a positive question, a modification relation, comparison, or dialect of each word included in the text;
extracting the target data that has been subjected to parsing for each brand;
tagging to text included in the target data a first tag on the basis of the company dictionary, a second tag on the basis of first classifications of a first dictionary including at least one first term indicating content expected by the company or the organization as a term indicating the brand, a third tag on the basis of second classification of a second dictionary including at least one second term indicating a response of a customer with respect to the brand, and a fourth tag on the basis of semantic analysis of a third dictionary including at least one third term used for the semantic analysis, the at least one first term being associated with respective first classifications, the at least one second term being associated with respective second classifications;
in response to determining that tagging has been completed for all target data:
calculating first individual index values for target data having first text tagged with a combination of the first tag and the second tag in the target data for the respective first classifications;
calculating second individual index values for target data having second text tagged with a combination of the first tag and the third tag in the extracted target data for the respective second classifications;

weighting the each first individual index value and each second individual index value on the basis of a type of the information medium of a collection source of each of the first text and the second text such that the influence of the information mediums are uniform;

performing a feelings determination process for each first individual index value and each second individual index value by determining whether the content of each of the first text and the second text is a positive expression or a negative expression on the basis of the fourth tag assigned to the first text or the second text;

calculating for each brand a first final index value based on a sum of the weighted first individual index values and the positive expressions or negative expressions;

calculating for each brand a second final index value based on a sum of the weighted second individual index values and the positive expressions or negative expressions; and generating information allowing display of a time series comparison of the first final index value and the second final index value.

\* \* \* \* \*